Patented June 19, 1928.

1,673,801

UNITED STATES PATENT OFFICE.

HARRY O. CHUTE, OF NEW YORK, N. Y.

VULCANIZATION ACCELERATOR.

No Drawing.    Application filed December 21, 1922. Serial No. 608,354.

This invention relates to vulcanization accelerators; and it comprises a method of producing accelerating materials useful in producing quick vulcanization of rubber wherein carbon bisulfid, one or more basic organic nitrogeneous bodies, such as the amines, and one or more basic metallic oxids or hydrates are allowed to interact and are then heated for a time to a temperature which usually approaches but does not exceed 138° C.; and it also comprises the compositions resulting; all as more fully hereinafter set forth and as claimed.

It is now common practice to accelerate the vulcanization of rubber or caoutchouc with sulfur by the addition of minor amounts of bodies which are known in the trade as accelerators. Broadly speaking, this is a very old practice, dating back to the discovery of vulcanization, although for many years only inorganic bodies of a basic nature, such as lead oxid (or its equivalent, the basic lead carbonates), zinc oxid, lime, magnesia, etc. were known or used. Later, the use of various organic accelerators, such as basic nitrogenous bodies, was proposed and such use has now become common. Many basic nitrogenous bodies are improved as accelerators by causing them to react with (or unite with) carbon bisulfid. Carbon bisulfid in reaction with the basic nitrogenous bodies of the nature of amids, guanidines, cyanamids, etc. produces a number of complex reaction products; and many of these bodies have proved to be good accelerators.

I have now found that even better accelerators can be produced by a modification of the last stated reaction, that between carbon bisulfid and organic nitrogenous basic bodies wherein such reaction is caused to take place in the presence of various inorganic basic compounds. This latter, the inorganic base, enters into the reaction and remains in the product; and its presence profoundly modifies such reaction. The various amids, amins, guanidines, etc. may be used in the new reaction. As to what rôle the basic inorganic compound plays in the reaction I am at present unaware and content myself with noting the utility of its presence without speculation as to the precise chemical reactions involved. The inorganic base used remains in and forms part of the resulting composition although the form of combination in which it occurs is uncertain.

It may be noted however in this connection that, where carbon bisulfid is caused to interact with amins, etc., in the presence of these basic bodies, the reaction, whatever it is, takes place energetically and with evolution of much heat and in the earlier stages of action cooling is usually necessary. When the evolution of heat slackens, I usually heat the materials and ordinarily finally carry the temperature up to a rather high point; not usually, however, above 135 to 140° C. About 138° C. is a good end temperature. During the action and particularly in the final heating stages, an evolution of hydrogen sulfid takes place; $H_2S$ being one of the products of the reaction. This is disposed of in any convenient way.

It is often advantageous to use a little catalyst in the mixture; one of the various catalysts known as facilitating reactions of carbon bisulfid with other bodies. Sulfur, hydrogen peroxid, camphor or phenols may be used as this catalyst.

Almost any basic inorganic body not in itself harmful to rubber may be used in my process. Certain of such bodies for example lead oxid, antimony pentasulfid, zinc oxid, lime and magnesia are well known as useful constituents of rubber mixtures. Copper, iron and manganese salts are known to be objectionable. I use only those which are known to be unobjectionable. I find lead oxid (or its equivalents, lead carbonates and hydrates), zinc oxid, lime and magnesia, the most useful for my purposes. All these bases are more reactive and more useful in hydrated form and when freshly prepared. Oxids which have been heated or have been stored a considerable time are usually much less reactive. On the whole, I find the use of magnesia of most advantage. While the commercial grades of magnesia and hydrated magnesia may be used, and particularly that preparation known as "light calcined magnesia", I find it better to make a preparation by precipitating hydrated magnesia from solutions of magnesium salts, such as magnesium chlorid by the use of lime. Slaked dolomite lime may be used for precipitating magnesia as may other alkaline bodies, such as sodium carbonate or ammonia. The precipitated magnesia is filter-pressed or otherwise treated for washing and drying and purification and is then dried at a relatively low temperature. As simultaneous mixture of these three bodies in the proportions stated is apt to cause an unduly violent reaction, it is best to mix two of them (preferably the magnesia and the anilin) and add the third (preferably the bisulfid) gradually. Even with a quite gradual addition of the bisulfid to a mixture of anilin and magnesia, outside cooling is usually necessary to restrain the action within manageable bounds and keep the temperature below that at which a rapid evolution of hydrogen sulfid occurs. After the bisulfid has all been added and the reaction begins to quiet down, heating is resorted to and continued until evolution of gas ceases or slackens materially and the mixture becomes a solid vesicular mass. The final temperature may be 135–140° C. The hard mass is dried in any convenient way, ground and packed or otherwise disposed of. It is stable on keeping. This material contains the elements of the original anilin and magnesia but in different stages of combination.

Compositions of the same character can be made by substituting paraphenylenediamin, guanidin, diphenylguanidin, cyanamid, dicyanamid, dicyandiamid, toluidin, both para and meta and the xylidines or mixtures of the same for the anilin in the above example. A particularly useful and active accelerator is made by substituting equal parts of diphenylguanidine and anilin for the anilin of the above example. The substitution of dicyandiamid for the above mentioned guanidine also produces a valuable accelerator.

With some basic organic bodies which, unlike the anilin of the above example, are not liquid, or which are not readily soluble in carbon bisulfid to give a liquid mixture, it is often desirable to use an indifferent solvent such as alcohol to facilitate the reaction.

The final material will vary somewhat in character and physical properties according to the raw materials used, but the products are usually whitish or greyish and more or less vesicular and most of them are fairly stable on keeping particularly if kept in air tight packages. The material made from anilin, bisulfid and magnesia contains their elements, but in different states of combination. Part of the sulfur of the carbon bisulfid unites with the hydrogen of the nitrogenous organic compounds escaping as hydrogen sulfid in the final heating. The final material therefore contains less sulfur than the original mixture.

In vulcanization, the rubber and compounding ingredients are carried up to a temperature usually not exceeding 138° F. and it is in order that the accelerators made as described shall be able to withstand this temperature without evolution of $H_2S$, that I carry the final temperature in making up acccelerators up to about this. Where vulcanization is to be at a less temperature, it is not necessary in finishing the accelerator that the final temperature be so high.

What I claim is:—

1. In the vulcanization of rubber, the process which comprises compounding unvulcanized rubber with vulcanizing agents and an accelerator, said accelerator being the reaction product of the process which comprises admixing carbon bisulfid, an aromatic organic amine, and an alkaline earth metal oxid, effecting the entire mixing of the three named constituents in the cold and without the liberation of the large quantities of hydrogen sulfid, and thereafter heating the mixture until gas evolution therefrom has substantially ceased.

2. In the vulcanization of rubber, the process which comprises compounding unvulcanized rubber with vulcanizing agents and an accelerator, said accelerator being the reaction product of the process which comprises admixing a metallic oxid with an aromatic organic amine, adding to such mixture carbon bisulfid while keeping the mixture cold and preventing the evolution of substantial quantities of hydrogen sulfid and after the addition of said carbon bisulfid heating the mix to a temperature not exceeding 140° C. until gas evolution has substantially ceased.

3. In the vulcanization of rubber, the process which comprises compounding unvulcanized rubber with vulcanizing agents and an accelerator, said accelerator being the reaction product of the process which comprises admixing, in the cold, magnesia and an aromatic organic amine, gradually adding to said mixture a quantity of carbon bisulfid while keeping the mixture cold and without the evolution of substantial quantities of hydrogen sulfid, and thereafter heating the mixture at a temperature below 140° C. until gas evolution has substantially ceased.

In testimony whereof, I have hereunto affixed my signature.

HARRY O. CHUTE.